United States Patent [19]

Shimizu

[11] Patent Number: 5,062,063
[45] Date of Patent: Oct. 29, 1991

[54] LENGTH MEASURING APPARATUS
[75] Inventor: Atsuko Shimizu, Akishima, Japan
[73] Assignee: Casio Computer Co., Ltd., Tokyo, Japan
[21] Appl. No.: 426,886
[22] Filed: Oct. 23, 1989

[30] Foreign Application Priority Data

Oct. 26, 1988 [JP] Japan ................. 63-139812[U]
Oct. 27, 1988 [JP] Japan ................. 63-140245[U]

[51] Int. Cl.⁵ ..................... G01B 11/02; G06F 7/00
[52] U.S. Cl. .................................. 364/562; 33/773
[58] Field of Search ........... 364/561, 562, 565, 446; 33/772, 773, 775, 780

[56] References Cited

U.S. PATENT DOCUMENTS 3,999,298 12/1976 Nishimura .......................... 33/775
4,009,339  2/1977 Anderson et al. ................. 364/561
4,383,301  5/1983 Morita et al. ..................... 364/562
4,914,831  4/1990 Kanezashi et al. ................. 33/780

FOREIGN PATENT DOCUMENTS 61-149801  7/1986 Japan .
61-169710  7/1986 Japan .
2150301  11/1984 United Kingdom .
2173615  10/1986 United Kingdom ............... 364/561

Primary Examiner—Parshotam S. Lall
Assistant Examiner—Michael Zawelli
Attorney, Agent, or Firm—Frishauf, Holtz, Goodman & Woodward

[57] ABSTRACT

A length measuring apparatus which is capable of calculating an actual distance by measuring length on a map and which has a display section to display the actual distance thus calculated. The length measuring apparatus includes a distance-data input switch for inputting a distance-index data of a scale-reduction scale indicated on the map and a memory for storing length of the scale-reduction scale on the map, which is measured by the rotation of a rolling member. The length measuring apparatus automatically calculated a scale-reduction value for the map from the distance-index data and the length of the scale-reduction scale stored in the memory. Accordingly, a user of the apparatus is not required to input the scale-reduction value for the map by means of keys.

20 Claims, 11 Drawing Sheets

LENGTH MEASURING APPARATUS

BACKGROUND OF THE INVENTION

1. Field of the Invention

The present invention relates to a length measuring apparatus for measuring the length of an object or length between two points, or a distance measure apparatus for measuring the distance between two points on a map.

2. Description of the Related Art

An apparatus is known which rotates a rotational disc along a line connecting two points and detects the amount of rotation of the disc to thereby measure the distance or length between the two points. Such a measuring apparatus is disclosed in, for example, Japanese Patent Disclosure Nos. 61-169710 and 61-149801.

U.S. Pat. No. 3,999,198 discloses such a measuring apparatus assembled in a wrist watch.

A technique concerning a measuring apparatus assembled in a wrist watch has been also described in U.S. patent application Ser. No. 315,526 U.S. Pat. No. 4,914,831 and 373,157 filed on Feb. 24, 1989 and June 28, 1989 (Assignee: Casio Computer Co., Ltd. assignee of the present invention). This type of length measuring apparatus is used as, for example, a map meter.

This type of map meter has a scale-reduction key for inputting scale-reduction data, with which scale-reduction key a scale-reduction data (for example, x-value of 1:x) printed on a map is input. Then the map meter calculates an actual distance by multiplying the value of the scale-reduction data to the length of a path on the map along which a roller travels or rolls.

However, some maps have no indication of a numerical scale-reduction index such as, for example, 1/10000. Many of these maps have a scale indicating the scale-reduction, e.g., a scale of 1 cm representing one mile at the bottom.

To use these maps, the user of the map is required a troublesome work that he has to calculate the scale reduction value from the length of the scale of the scale reduction for the map and its length unit, and calculated into a map meter with use of a scale-reduction key.

SUMMARY OF THE INVENTION

The present invention has been intended to solve the problem described above, and its object is to provide a map meter capable of automatically calculating a scale-reduction value for the map having no numerical scale-reduction value from a scale of scale-reduction printed thereon.

To achieve the above object, according to the present invention, there is provided a length measuring apparatus which comprises length memory means for storing first length data of a scale-reduction scale; distance-index data input means for inputting distance-index data of the scale-reduction scale on a map; scale-reduction data operation means for performing operations on the first length data stored in said length memory means and the distance-index data input by said distance-index data input means to obtain scale-reduction data; length measurement means for measuring length of a path connecting two points on the map, to obtain second length data; distance data operation means for performing operations on the second length data obtained by said length measurement means and the scale-reduction data obtained by said scale-reduction data operation means to obtain distance data; and, display means for displaying the distance data obtained by said distance-data operation means.

The construction described above allows to realize a length measuring apparatus according to the present invention, which is used conveniently, since it requires no calculation of a scale reduction value from a scale of the scale reduction printed on a map and also requires no key-operation for inputting the calculated scale-reduction value thereto.

DETAILED DESCRIPTION OF THE PREFERRED EMBODIMENTS

Now, preferred embodiments of the invention will be described with reference to the accompanying drawings.

Figure 1:
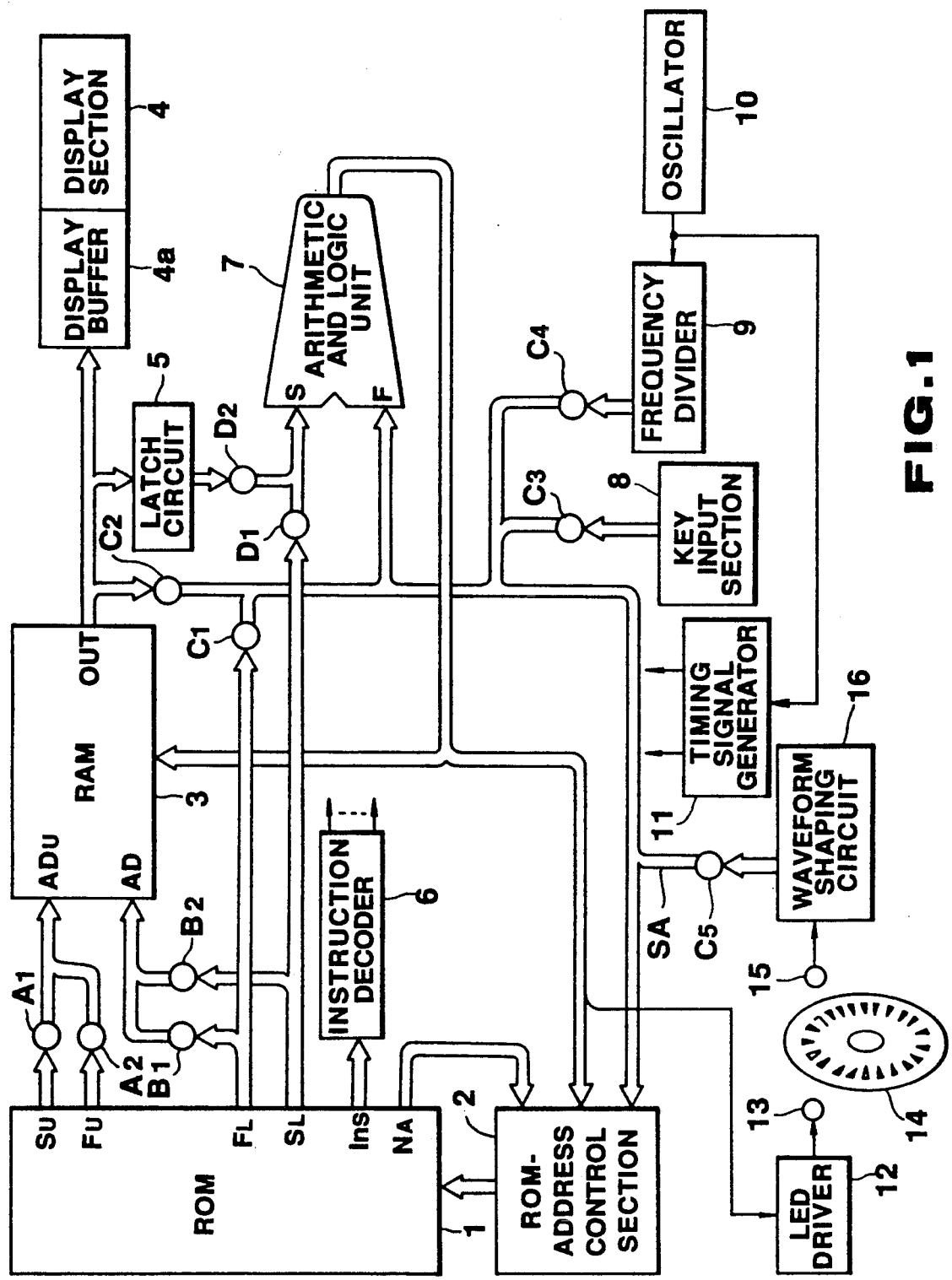
FIG. 1 is a view showing a circuit construction of an electronic wrist watch with a map-meter function according to an embodiment of the invention.

FIG. 1 is a block circuit diagram of the electronic wrist watch with a map-meter function according to the present invention. In FIG. 1, ROM 1 is a memory including a micro-program for controlling operations of a whole system, numerical values and other constant data. A ROM-address control section 2 is a block for appointing addresses of ROM 1 in order to control the flow of the program. The ROM-address control section 2 is supplied with an output signal NA of ROM 1 for appointing a next-address, an output signal of an arithmetic and logic unit (ALU) 7 and an output signal of a frequency divider 9. RAM 3 is a memory which outputs data stored at addresses appointed by address-data outputs SU, SL and FU, FL of ROM 1 and which receives and stores a result of an arithmetic operation for the above data executed by ALU 7. An instruction decoder 6 is a block which decodes an instruction output signal INS of ROM 1 and delivers control signals to respective blocks. A latch circuit 5 is a circuit which temporarily stores contents of RAM 3 and supplies them to an input S of ALU 7 in synchronism with the input F of ALU 7. ALU 7 performs arithmetic logic operations on inputs S, F and writes the operation results into addresses of RAM 3 appointed by outputs FU, FL of ROM 1. An oscillator 10 generates and supplies a clock signal having a fixed period to the frequency divider 9 and a timing-signal generator 11. The timing-signal generator 11 divides the above clock signal to obtain a timing signal for sequentially controlling respective blocks. The frequency divider 9 is a counter which divides the output signal of the oscillator 10 to produce and output a time-counting signal having a fixed time-period.

A key-input section 8 is a block which supplies a key-input signal to instruct various processing operations and which is composed of switches $S_1$, $S_2$, $S_3$ and $S_4$, as will be set forth with reference to FIG. 2. A display section 4 comprises a display device such as a dot-matrix liquid crystal cell, EL-device and the like. The display section 4 is a block which temporarily stores data delivered via a bus in its display buffer 4a and then displays the data on the display device.

An LED driver 12 is controlled to drive a light emitting element, e.g., an LED 13, while the map meter is used. A reference 15 denotes a light receiving element such as a photo-diode or photo-transistor. The output signal of the light receiving element is supplied to a waveform shaping circuit 16, at which the waveform of the output signal is shaped. The output signal having a shaped waveform is further delivered to ALU 7. There is provided a rotating disc 14 between the LED 13 and the photo-diode 15. The rotating disc 14 has a plurality of slits or through holes disposed in the vicinity of the periphery of the disc 14. The rotating disc 14 is mechanically connected through a gear train (not shown) to a roller 19 which is rotatably mounted on a side wall of a watch casing 18 of the electronic wrist watch 17 with a map-meter function shown in FIG. 2.

Bus controller gates $A_1$, $A_2$, $B_1$, $B_2$, $C_1$, $C_2$, $C_3$, $C_4$, $C_5$, $D_1$ and $D_2$ shown in FIG. 1 serve to control a data-flow through respective bus lines on the basis of output signals from the instruction decoder 6.

Figure 2:
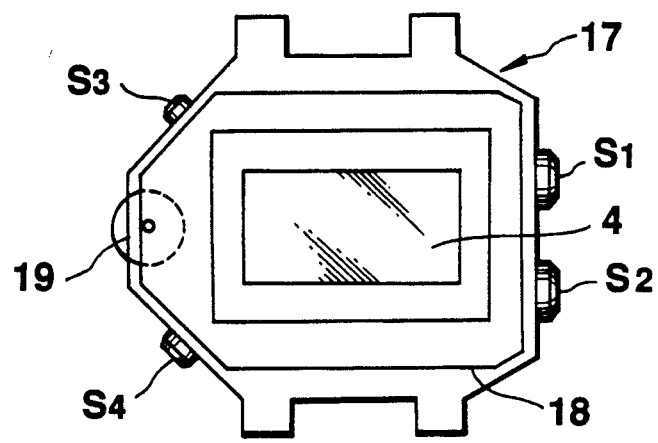
FIG. 2 is an external view of the above electronic wrist watch with a map-meter function.

FIG. 2 is an external view of the electronic wrist watch with a map-meter function which has the circuit construction of FIG. 1. On the display section 4 a present time data including "month", "day", "year", "day of the week" and "time" is displayed. Four switches $S_1$, $S_2$, $S_3$ and $S_4$ are mounted on the watch casing 18. A map mode is selected by depression operations of the above switches $S_1$, $S_2$, $S_3$ and $S_4$ and thereby various processes required in the map meter are executed.

Figure 3:
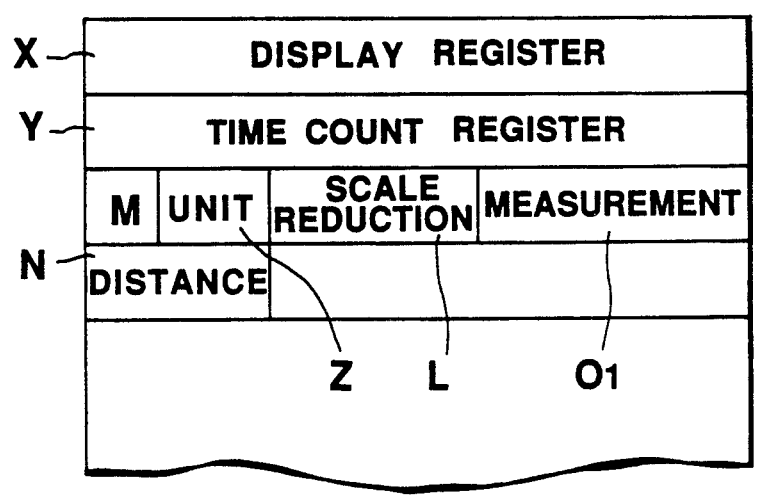
FIG. 3 is a view showing a detailed construction of RAM 3 of FIG. 1.

FIG. 3 is a view showing a memory area of RAM 3 shown in FIG. 1. RAM 3 includes various registers. A display register X is for storing display data to be displayed on the display section 4. A time count register Y is for storing a present time data.

A register M is a mode register for storing numerals 0 through 4.

A unit register Z is a register for storing numerals corresponding to distance units such as "mm", "cm", "m" "km", "inch", "feet" and "mile". A scale-reduction register L is for storing scale-reduction data. A measurement register 0 is for storing length data obtained on a map. A distance register N is for storing actual length obtained from the scale-reduction and length on a map.

Figure 4:
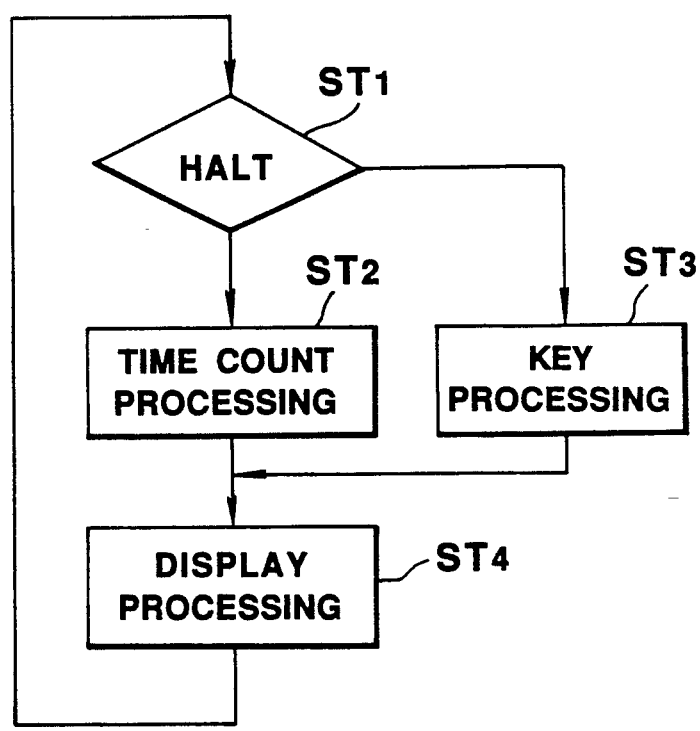
FIG. 4 is a flow-chart of the operation of the whole circuit shown in FIG. 1.

FIG. 4 is a general flow-chart of the circuit of FIG. 1. When, in a halt state at step $ST_1$ of FIG. 4, a time count signal is generated at intervals of a certain time duration, e.g. 1/16 seconds, a time-count process is executed to renew the time at step $ST_2$. More specifically, the present time data such as "month", "day", "year", "day of the week", "time", "minute" and "second", stored in the time-count register Y are renewed, and they are stored again in the time-count register Y. At step $ST_4$, a display process is executed to display these data on the display section 4 of the electronic watch, and the process returns to step $ST_1$. Then, the processes at steps $ST_1$, $ST_2$ and $ST_4$ are repeatedly executed. When one of switches $S_1$ to $S_4$ is operated in the halt state, a key-processing is executed at step $ST_3$ and then the display process is executed at step $ST_4$ and the process returns to the halt state at step $ST_1$, again.

When the rotating disc 14 is rotated and an output signal is output from the waveform shaping circuit 16, the process is executed at step $ST_3$ in the similar way to those executed when the above switches $S_1$ through $S_4$ are operated.

Detailed operations of the above key-processing at step $ST_3$ will be described with reference to the flow-chart of FIG. 5 and the mode transition shown in FIG. 6.

Figure 6:
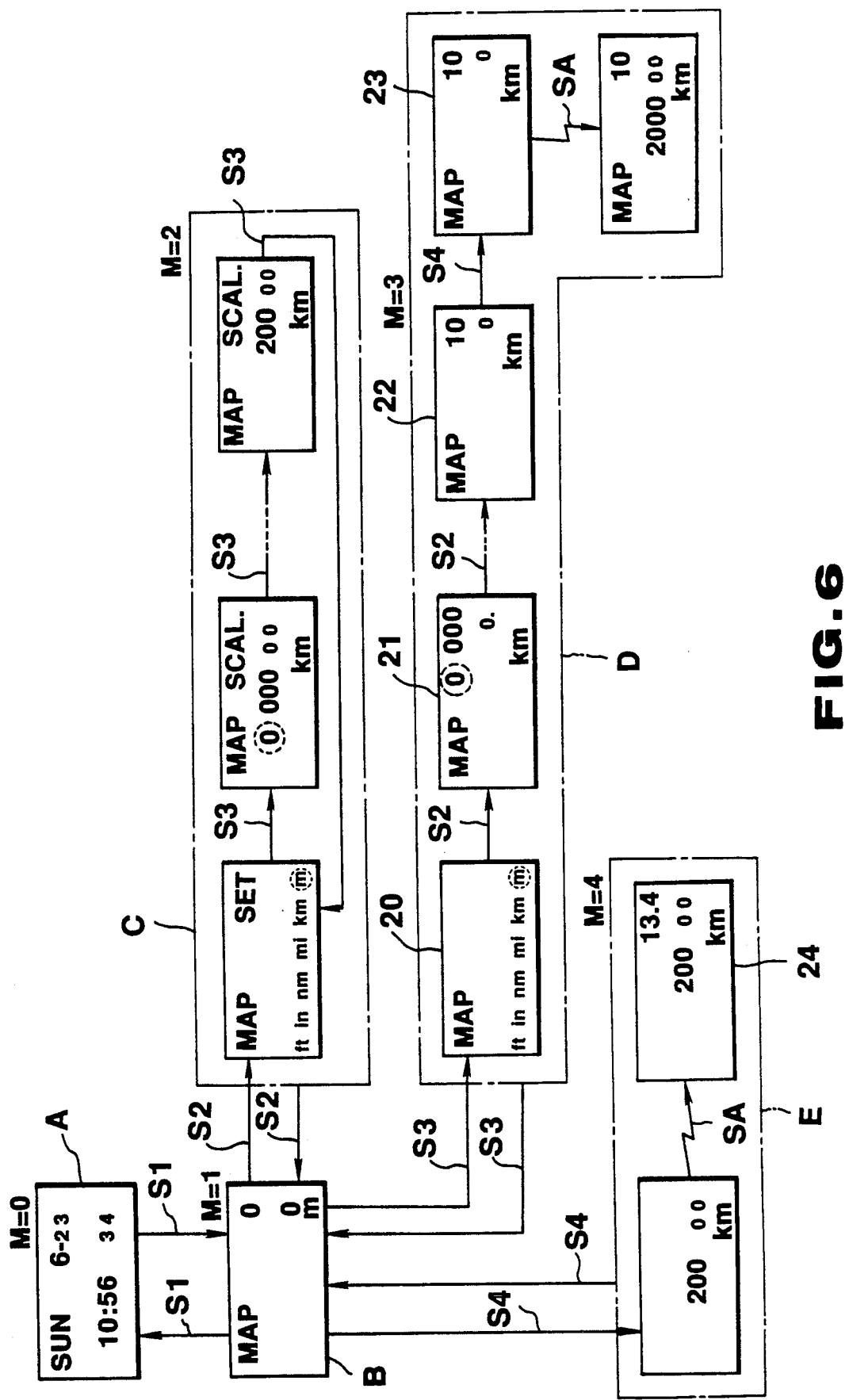
FIG. 6 is a view showing a transition of a display state.

The contents of the mode register M of RAM 3 are $M=0$, a time-piece mode is set in which "month", "day", "day of the week" and "time", "minute", "second" are displayed as shown at A in FIG. 6. When the switch $S_1$ is depressed in this state, the contents of the mode register M become $M=1$ and a map-meter mode is set, in which characters "MAP" are displayed as shown at B in FIG. 6.

Figure 5:
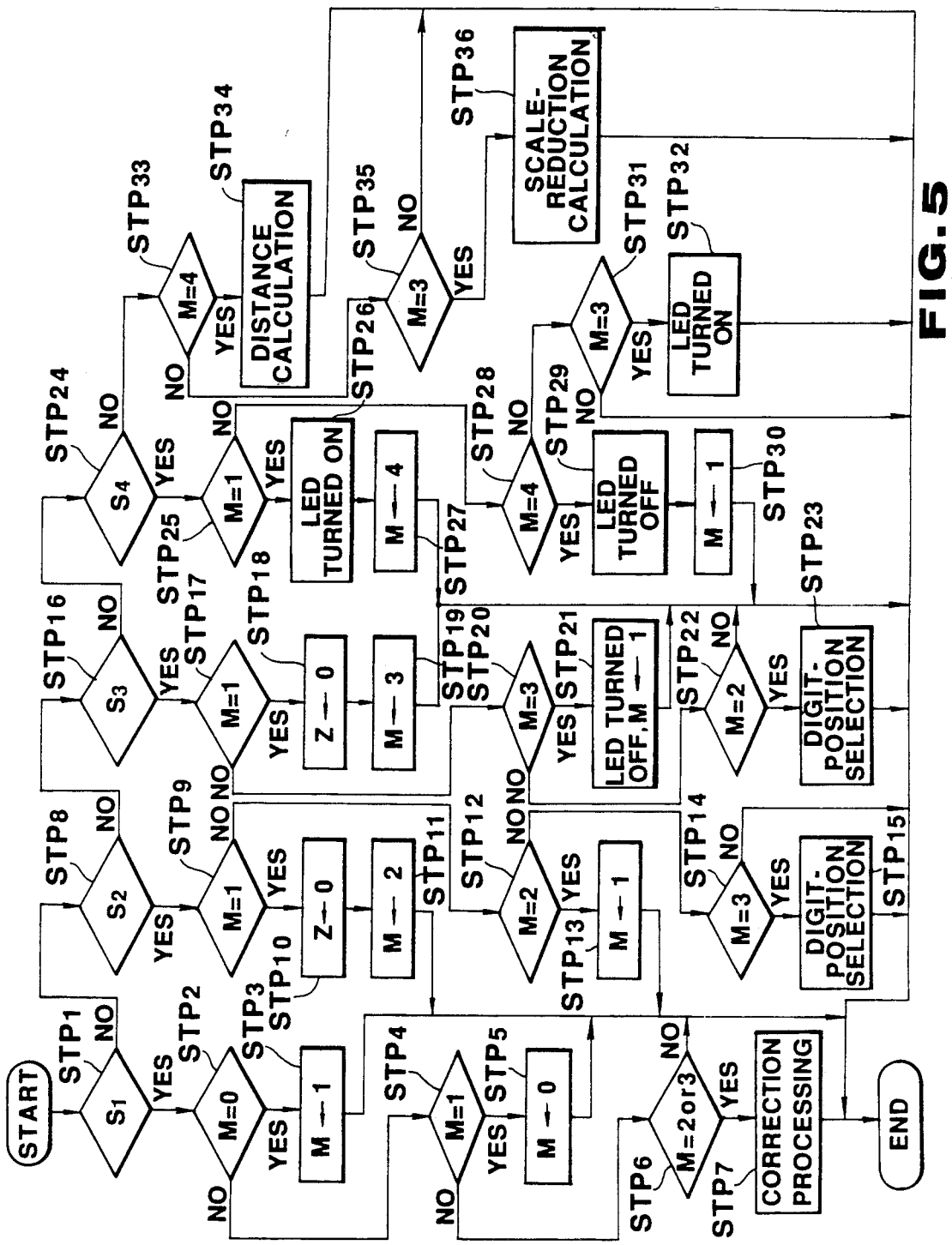
FIG. 5 is a flow-chart of a key-processing of FIG. 4.

More specifically, in the flow-chart of FIG. 5, at step $STP_1$, "ON" operation of the switch $S_1$ is detected and a judgement is made at step $STP_2$ as to whether or not the content of the mode register M is $M=0$. When the contents of the mode register M is $M=0$, that is, the time count mode is set, then the process, goes to step $STP_3$, at which the map meter mode $M=1$ is set, and then the process terminates. If at step $STP_2$ the time count mode, i.e., $M=0$ is not set, a judgement is made at step $STP_4$ as to whether or not the map meter mode $M=1$ is set. If the map meter mode is set at step $STP_4$, the mode is set to $M=0$ at step $STP_5$ to set the time count mode. Then the process terminates. If at step $STP_4$ the map meter mode, i.e., $M=1$ is not set, the process goes to step $STP_6$, at which a judgement is made as to whether the mode is set to $M=2$ or $M=3$. If $M=2$ or $M=3$ is set at step $STP_6$, then the process goes to step $STP_7$, at which a correction processing is executed. Then the process terminates. More specifically, when the mode is set to $M=2$ or $M=3$, the switch $S_1$ is used to correct digits selected by operation of the switch $S_2$ or $S_3$ as will be described later.

When, in the map meter mode, i.e., $M=1$ shown at B in FIG. 6, the switch $S_2$ is depressed, the contents of the mode register M is changed to $M=2$ to set a first scale-reduction setting mode shown at C in FIG. 6. In the first scale-reduction setting mode, scale-reduction scale is set by operations of the switches $S_1$ and $S_3$. When a scale reduction, for example, 1:20000 is indicated on a map, the depressing operation of the switch $S_2$ sets the scale-reduction setting mode, in which distance units or length units such as "ft", "in", "nm", "km" and "m" are displayed on the display section 4. One of these distance units is selectively specified by every operation of the switch $S_1$. More specifically, when the scale-reduction mode is set, the unit "m" is selected at first and displayed in a flashing manner and thereafter another unit is selected and displayed in a flashing manner in the order from "m" to "ft" by operation of the switch $S_1$. Depressing operation of the switch $S_3$ in the scale-reduction setting mode sets a scale-reduction data setting mode, in which the leading digit of six digit display elements is displayed in a flashing manner. When the switch $S_1$ is operated in this state, numerical data from "0" to "9" is sequentially set at the position of the leading digit. When the switch $S_3$ is operated again, the second digit of the numerical display elements is selected. In this way it is indicated on the display section 4 that the scale reduction for the map is, for example, 1:20000 and the selected distance unit is "km". More specifically, at step $STP_8$ of FIG. 5, a judgement is made as to whether or not the switch $S_2$ is operated. When the operation of the switch $S_2$ is detected, the process goes to step $STP_9$, where a judgement is made whether or not the map meter mode is set or whether or not the contents of the register M is $M=1$. When the map meter mode, i.e. $M=1$ is set, the value of the distance-unit register Z is set to "0" corresponding to "m" at step $STP_{10}$. At step $STP_{11}$ the contents of the mode register M is set to $M=2$ and the process terminates. When at step $STP_9$ the map meter mode, i.e. $M=1$ is not set, a judgement is made at step $STP_{12}$ as to whether or not the first scale-reduction setting mode, i.e. $M=2$ is set. If $M=2$ is true at $STP_{12}$, the mode is changed to the map meter mode, $M=1$ at step $STP_{13}$. In this way, the map meter mode at B in FIG. 6 and the scale-reduction setting mode at C in FIG. 6 are alternatively selected by every operation of the switch $S_2$. When the switch $S_1$ is operated in the first scale-reduction setting mode, i.e. $M=2$, $M=2$ is detected at step $STP_6$ of FIG. 5. Then a distance unit is selected and a numeral at the selected position is set at step $STP_7$. The operation of the switch $S_3$ is detected at step $STP_{16}$ and the process advances through steps $STP_{17}$ and $STP_{20}$ to step $STP_{22}$, where $M=2$ is detected. At step $STP_{23}$ a position to be corrected is selected.

Then data corresponding to the selected unit is stored in the register Z of RAM 3 and scale-reduction data, for example, "20000" for the map of scale reduction 1:20000 is stored in the scale-reduction register L.

Figure 7:
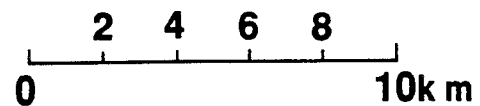
FIG. 7 is a view showing an example of scale-reduction display for a map.

Meanwhile, when the switch $S_3$ is depressed in the map meter mode at B in FIG. 6, the second scale-reduction setting mode at D in FIG. 6 is set. In the second scale-reduction setting mode, scale-reduction data is obtained from the scale-reduction scale indicated on the map. In case that, for example, the scale-reduction scale is indicated on the map as shown in FIG. 7, the switch $S_1$ is operated for appropriate times to select the unit representing "km". Then the switch $S_2$ is operated to bring the display section 4 into a distance-figure setting state as shown at 21 in FIG. 6. Digits of a distance-figure are set by operations of the switch $S_1$. A unit distance of the scale actually indicated on the map is set at respective digit positions, that is, in FIG. 7, the scale "10 km" is set. The following digit position is selected by every operation of the switch $S_2$. As a result, a unit "km" and a distance "10" are displayed on the display section 4 as shown at 22 in FIG. 6. When the switch $S_4$ is operated in this state, the display state of the display section 4 becomes a state as shown at 23 in FIG. 6 and is not changed from the state shown at 22 in FIG. 6. But when the roller shown in FIG. 2 is rolled along the scale-reduction scale of FIG. 7 from "0" to "10 km" to measure its length, then a signal SA shown in FIG. 1 is produced by the waveform shaping circuit 16 and supplied to ALU 7. ALU 7 calculates a scale-reduction value for the map, e.g., 1:200000 from the distance "10 km" and the measured length and it displays the calculated scale-reduction value on the display section 4.

A key processing executed in this way will be described with reference to FIG. 5. At step $STP_{16}$ an operation of the switch $S_3$ is detected and then at step $STP_{17}$ a judgement is made as to whether or not the map meter mode, i.e., $M=1$ is set. When the map meter mode, i.e., $M=1$ has been set, at step $STP_{18}$, the distance unit register Z is set to "0", that is, unit "m" is selected and at step $STP_{19}$ mode register M is set to $M=3$. At step $STP_{17}$, if $M=1$ is not true, a judgement is made at step $STP_{20}$ whether or not $M=3$ is set. When it is decided at step $STP_{20}$ that $M=3$ is true, LED 13 is turned off and the mode register M is caused to return to "1" at step $STP_{21}$. More specifically, when the switch $S_3$ is operated in the map meter mode, i.e., $M=1$, the second scale-reduction setting mode, i.e., $M=3$ is set, and when the switch $S_3$ is operated in the second scale-reduction setting mode, i.e., $M=3$, the map meter mode, $M=1$ is set again. Meanwhile, when the switch $S_1$ is operated in the second scale-reduction setting mode, i.e., $M=3$, the process advances through steps $STP_1$, $STP_2$, $STP_4$ and $STP_6$ to step $STP_7$, where a distance unit is selected and selected digits are corrected. In this case, selection of digits to be corrected is executed at step $STP_{15}$, to which the process is advanced through steps $STP_8$, $STP_9$, $STP_{12}$ and $STP_{14}$ by operations of the switch $S_2$. In this way, the distance-index data of the scale shown in FIG. 7, for example, "0" is stored in the distance register N.

When an operation of the switch $S_4$ is detected at step $STP_{24}$, the process goes through steps $STP_{25}$ and $STP_{28}$ to step $STP_{31}$, at which it is decided that the second scale-reduction setting mode, i.e., $M=3$ is set, that is, the mode shown at D in FIG. 6 is set. At the following step $STP_{32}$ LED is turned on. More specifically, the display state 22 of the display section 4 shown at D in FIG. 6 is transferred to the display state 23 and then LED 13 of FIG. 1 is turned on. When the roller 19 shown in FIG. 2 is rolled, the rotating disc 14 of FIG. 1 is rotated and thereby the waveform shaping circuit 16 of FIG. 2 outputs a signal SA. The signal SA is output while the result of the judgement at step $STP_{24}$ is "NO". The process advances through step $STP_{33}$ to step $STP_{35}$, at which a judgement setting mode, i.e., M-3 is set. When it is decided at step $STP_{35}$ that $M=3$ is true, a scale-reduction value is calculated at the following step $STP_{36}$. As described above, a scale reduction is calculated from the unit previously set in the unit register Z at 20, 21, 22 of FIG. 6 and the distance data "10" stored in the distance register N and the calculation result, i.e., 10 km ÷ 5 cm = 200000 is set in the scale-reduction register L.

Now, a measurement mode in which an actual distance is measured will be described. When the switch $S_4$ is depressed in the map meter mode, $M=1$, the measurement mode, i.e., $M=4$ shown at E in FIG. 6 is set. The roller 19 is rolled along the road on a map and the product of the travel distance of the roller 19 and the scale-reduction value is displayed on the display section 4.

The key processing in the measurement mode will be described with reference to FIG. 5. An operation of the switch $S_4$ in detected at $STP_{24}$ and then a judgement is made at step $STP_{25}$ as to whether or not the map meter mode, i.e., $M=1$ is set. When the map meter mode is set, LED 13 is turned on at step $STP_6$ and then the mode register M is set to $M=4$. In this way the measurement mode is set. Meanwhile, when it is decided at step $STP_{25}$ that the map meter mode, $M=1$ has not been set, the process goes to step $STP_{28}$ at which a judgement is made as to whether or not the measurement mode, i.e., $M=4$ is set. When it is decided that $M=4$ is true, LED 13 is turned off at step $STP_{29}$ and at the following step STP$_{30}$ the mode is returned to the map meter mode, M=1.

When the roller 19 is rolled and the signal SA is output in the measurement mode M=4, the process goes to step STP$_{33}$, at which a judgement is made as to whether or not the mode is set to the measurement mode, i.e., M=4. When M=4 is true, at step STP$_{34}$ ALU 7 calculates a distance based on the scale-reduction value and the length actually measured on the map, that is, ALU 7 multiplies the above length by the scale-reduction value. Then ALU 7 stores the product in the distance register N and causes the display section 4 to display the above product. A display state 24 shown at E in FIG. 6 is an example, which indicates that the distance calculated in the above mentioned manner is 13.4 km.

Since the present embodiment is constructed and operates in the manner as described above, a map meter is available which automatically calculates the scale-reduction value for the map on which only the scale-reduction scale with no numerical scale-reduction index is indicated, by rolling the roller along the above scale-reduction scale.

Figure 8:
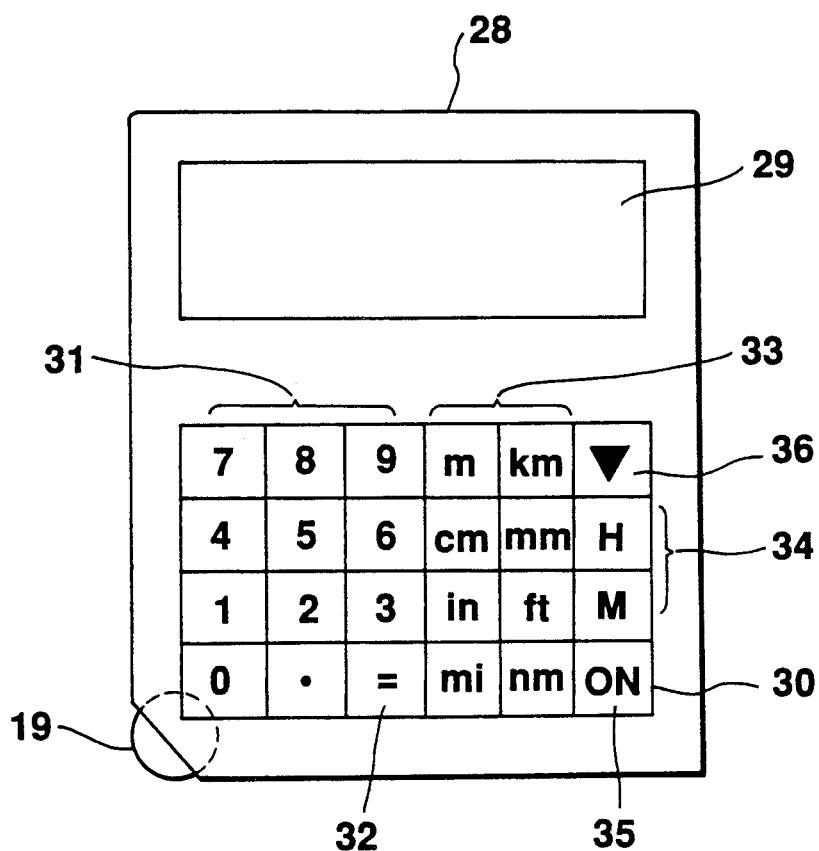
FIG. 8 is an external view of a map-meter according to another embodiment of the invention.
Figure 9:
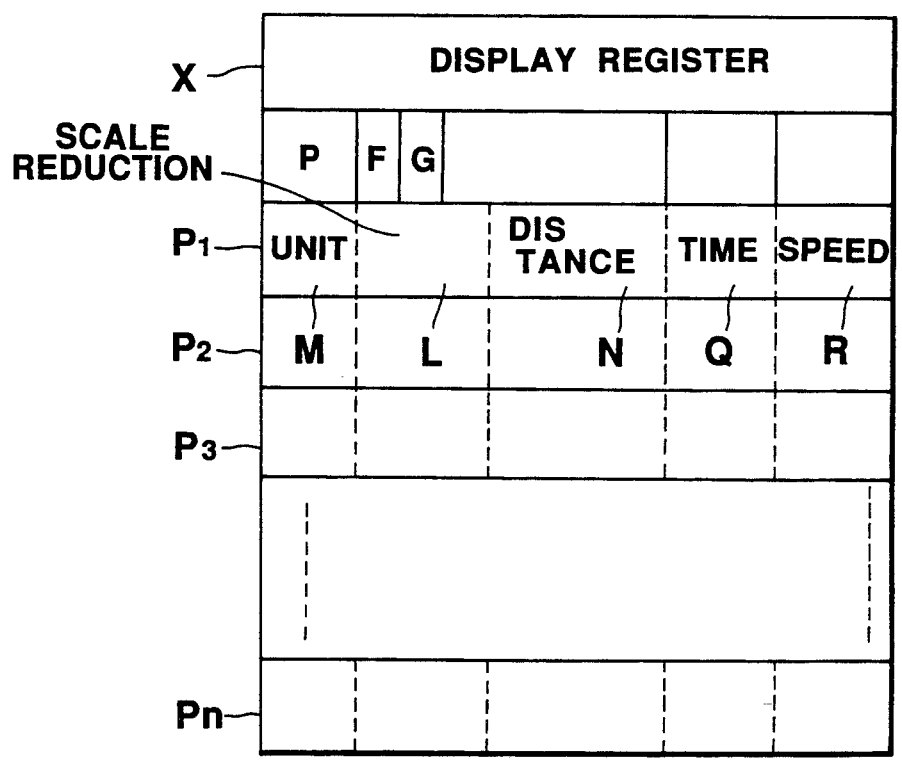
FIG. 9 is a view showing contents of a register of RAM in the map meter of FIG. 8.

FIGS. 8 through 13 are views showing other embodiment of the present invention. The present embodiment has a similar circuit construction to that shown in FIG. 1, in which RAM of FIG. 9 is used instead of RAM 3. The present embodiment is different from the embodiment described above only in the flow-chart of FIG. 10 controlled by ROM 1. FIG. 8 is an external view of a map meter 28 of a handy type according to the present invention. A display section 29 and a keyboard 30 are provided at the upper and lower portions of the front panel of the map meter 28, respectively. A rotating roller 19 similar to that shown in FIG. 2 is provided at the bottom corner. Various entry keys such as numeric keys 31 including a decimal point key and an equal key (=) 32 are mounted on the keyboard 30. Further, unit keys 33 including keys representing a system of meter units such as "mm", "cm", "m" and "km" and keys representing a system of feet units such as "inch (in)", "feet (ft)" and "mile (mi)" are mounted on the keyboard 30. Furthermore, time-setting keys 34 for inputting an hour unit and a minute unit, ON key 35 for distance calculation and a search key 36 are mounted on the keyboard 30.

FIG. 9 is a view showing contents of RAM 3 of FIG. 2. A reference X denotes a display register in which data to be displayed on the display section 29 is stored. References P$_1$ through P$_n$ denote registers in which unit data, scale-reduction data, distance data, hour data and speed data are stored respectively. A register P is a pointer which appoints one of the above registers P$_1$ through P$_n$. Registers F, G are registers which are set, when a scale-reduction and a unit are set, and when a distance is measured.

The operation of the map meter 28 will be described in detail with reference to the flow-chart of FIG. 10 and the transition of the display mode shown in FIGS. 11 to 13.

The map meter 28 is brought to a state in which data in the registers P$_1$ through P$_n$ of RAM 3 are sequentially displayed on the display section 29 every time when the search key of the keyboard 30 shown in FIG. 8 is depressed.

The operation of the map meter 28 will be described referring to the flow-chart of FIG. 10. When the search key 36 is operated, the process goes through steps ST$_1$, ST$_6$ to step ST$_{10}$ at which the operation of the search key 36 is detected. At the following step ST$_{11}$ +1 is added to the value of the register P and at step ST$_{12}$ a decision is made as to whether or not the value of the register P has become n+1. Since the map meter is provided with n units of registers P, the flow of the operation terminates when the value of P is not more than n. As a result, the contents of the register P appointed by P$_n$ are displayed.

Figure 11:
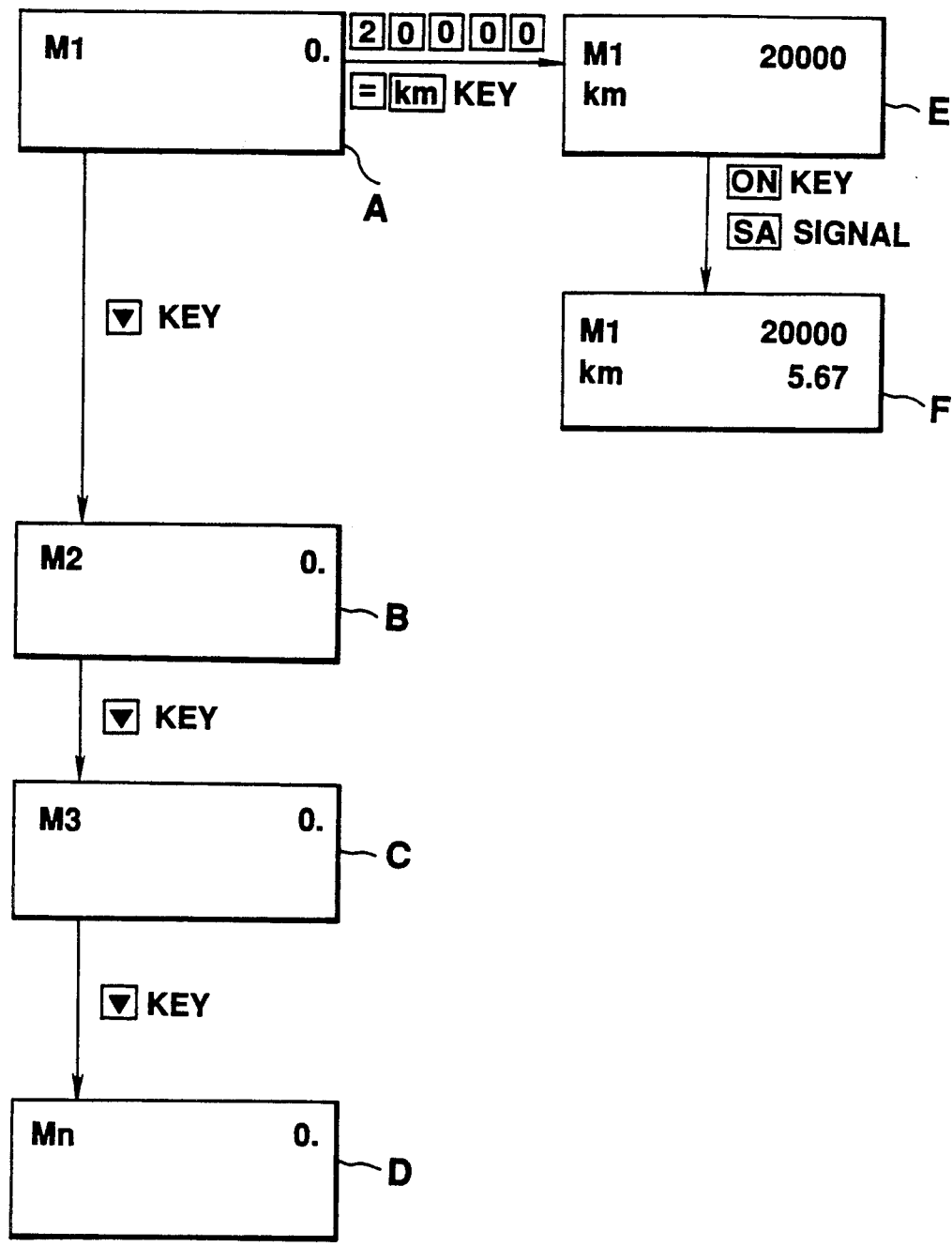
FIGS. 11 to 13 each are a view showing a transition of a display state of a display section.

For example, when the value of P is 1, the content of the register P$_1$ is displayed as shown at A in FIG. 11. At this time, M1 which indicates that what is on display is the first memory is displayed on the display section. When the search key 36 is operated in this state, the value of P becomes 2 at step ST$_{11}$ and the content of the register P$_2$ is displayed as shown at B in FIG. 11. At A, B, C, D in FIG. 11 states where no data has been input to the register P are displayed, but when data has been stored in the register P, then the stored data is displayed.

When data is to be set in the state where the content of the register P$_1$ shown at A in FIG. 11 is displayed, the scale-reduction data, for example, 20000 (in case of scale-reduction 1:20000) is input and "=" key is operated. The operation of "=" key advances the process from step ST$_1$ of FIG. 10 to step ST$_2$, at which a judgement is made as to whether or not numerical data has been input. In this case, numerical data 20000 has been input. Therefore, the process goes to step ST$_3$, at which judgement is made as to whether or not "H" key and "M" key have been operated. In this case as these keys have not been operated, numerical data of 20000 is stored as a scale-reduction data in the scale-reduction data memory L of the register P$_1$.

When for example "km" key among the unit keys 33 representing a distance is depressed, the process goes from step ST$_6$ to step ST$_7$, at which a judgement is made as to whether or not distance data exists. Since no distance data has been input at this time, at step ST$_8$ a unit "km" of depressed key is set as a distance unit in the unit register M of the register P$_1$. A display state of the display section 29 at this time is indicated at E in FIG. 11. More specifically, when the scale-reduction value indicated on a map, for example, 20000 is input, the equal key 32 is operated and the unit key, for example "km" key is depressed, then "km" and the scale-reduction value 20000 are displayed.

When, in this state, the roller 19 is rolled on the map with "NO" key being operated, the signal SA is output from the waveform shaping circuit 16 of FIG. 11. More specifically, when the operation of "NO" key is detected at step ST$_{15}$ of FIG. 10 and the signal SA is detected at step ST$_{16}$, then the process goes to step ST$_{17}$, at which an actual distance is calculated from the above scale-reduction data 20000 and the above signal SA, and the distance is stored in the distance register N of the register P$_1$ and at the same time displayed, for example as 5.67 km as shown at F in FIG. 11.

Figure 12:
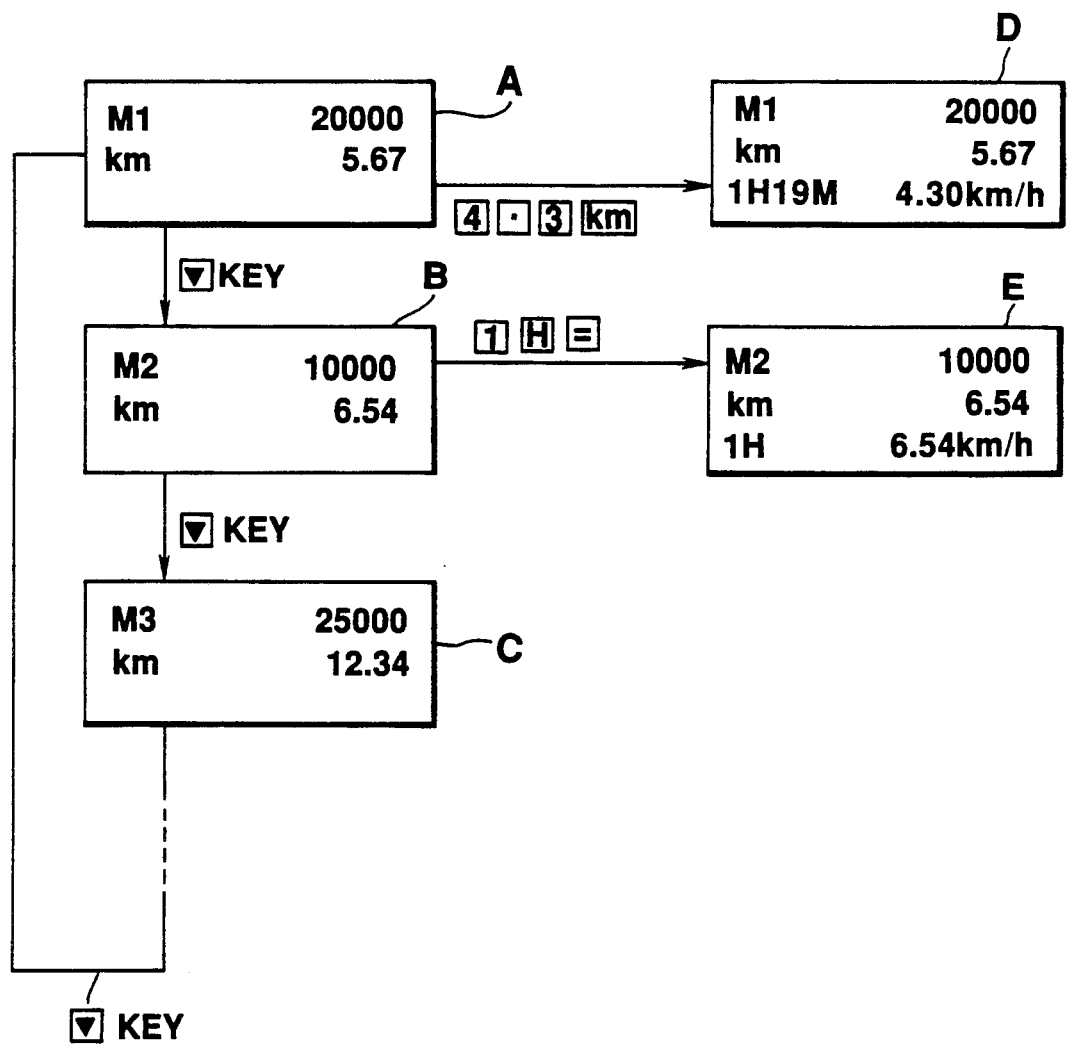
Figure 13:
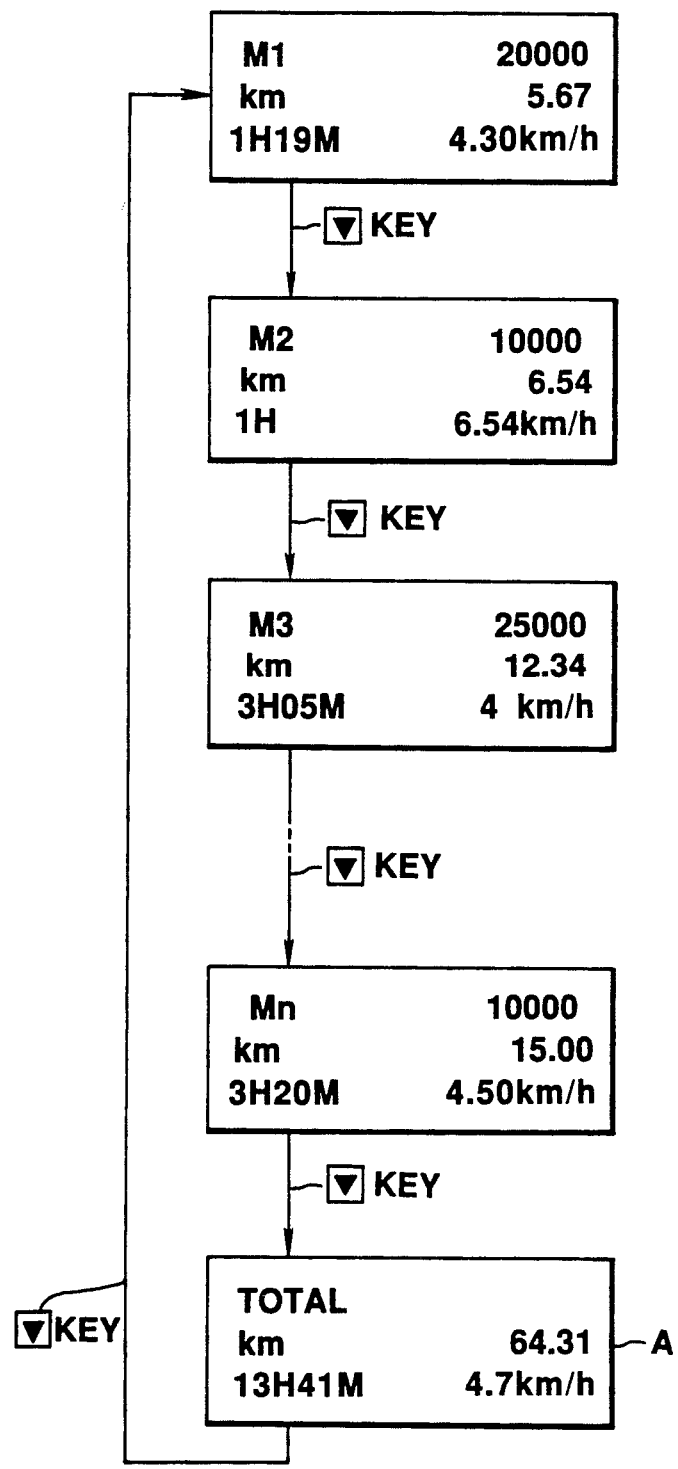

FIG. 12 is a view indicating at A, B and C that distance data 5.67 km, 6.54 km and 12.34 km are set in the registers P$_1$, P$_2$ and P$_3$, respectively and are alternatively displayed by operations of the search key 36.

If a user of the map meter wants to know how many hours are required for walking 5.67 km at a walking speed of 4.3 km/hour, he sequentially operates entry keys to input "4", ".", "3" and "km". In this case, "km" key is used as a key representing "km/H".

Figure 10:
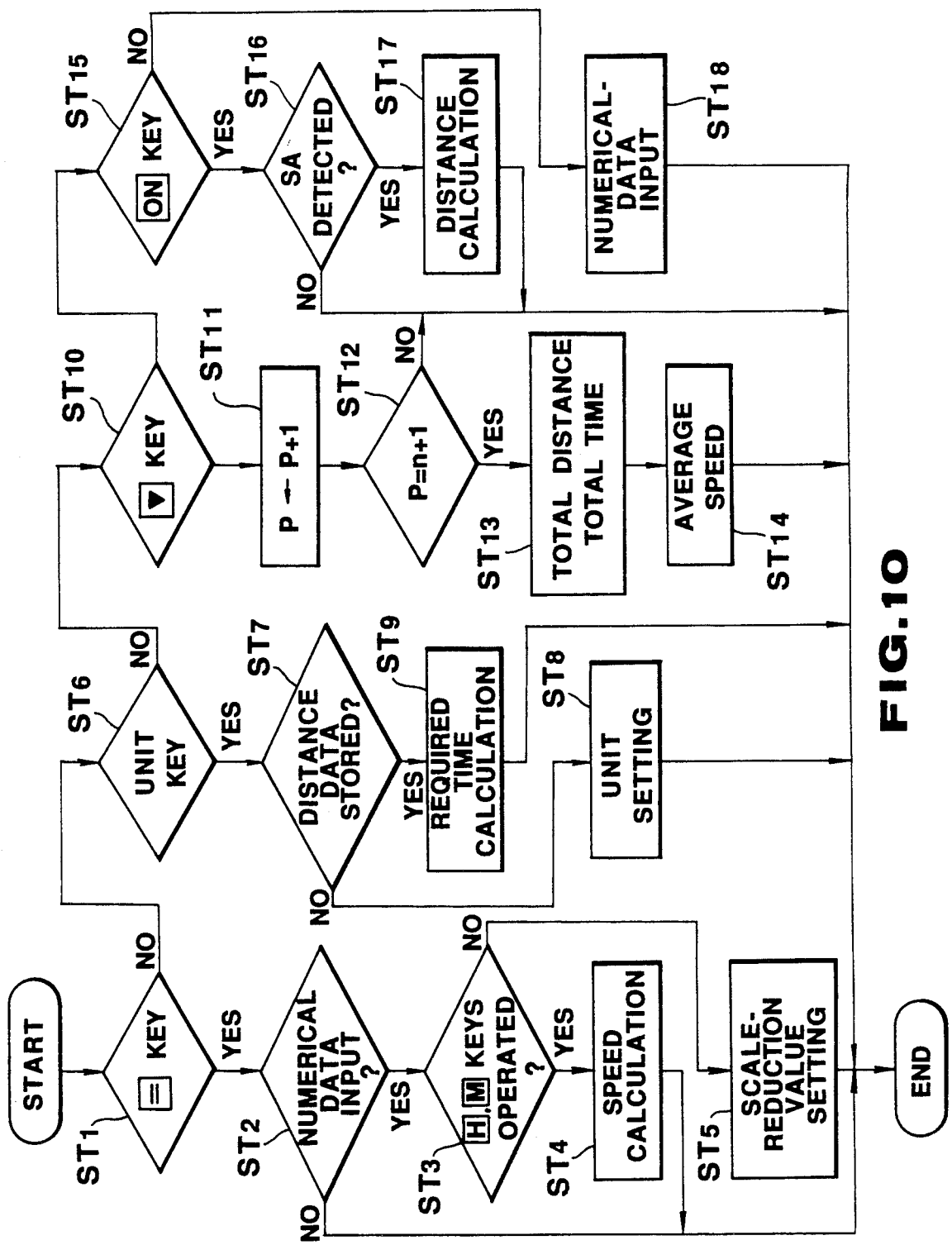
FIG. 10 is a flow-chart of the operation of the map meter shown in FIG. 8.

The input operation of "km" key is detected at step $ST_6$ of FIG. 10 and a judgement is made at step $ST_7$ as to whether or not distance data has been stored in the register $P_1$. Since the distance data 5.67 km has been already stored in the register $P_1$, the process goes to step $ST_9$, at which a required hour (hour required for walking 5.67 km at a speed of 4.3 km/H) is calculated. Then the required hour, 1 hour and 19 minutes is stored in the required hour register Q of the register $P_1$ and the required hour is displayed on the display section together with the speed of 4.3 km/H which has been already input to the speed register R as shown at D in FIG. 12.

For example, if the user of the map meter wants to move in one hour a distance of 6.54 km which is indicated on the display section as shown at B in FIG. 12, he is simply required to operate "1", "H" and "=" keys in order to obtain a moving speed.

The operation of "H" key after entry of "1" is stored in a flag F of RAM 3, and is detected at the following step $ST_3$ of FIG. 10 by the operation of "=" key. At step $ST_4$ the moving speed is calculated. The calculated speed and the input required hour are stored in the register $P_2$, respectively and are displayed on the display section as shown at E in FIG. 12.

When only a minute unit key is operated to input the required hour, the operation of the minute unit key is stored in the flag G of RAM 3. The operation of the minute unit key is detected at step $ST_3$ and the processing similar to that mentioned above is executed.

In the present embodiment described above, required hours and running or walking speeds can be obtained from distances which have been measured with the map meter 28.

Also when the search key 36 is operated after setting of required hours and speeds in all of the registers $P_1$ through $P_n$, the pointer P is sequentially incremented, for example, from $P_1$ at steps $ST_{10}$ and $ST_{11}$. Therefore, as shown in FIG. 13, the display state on the display section 29 is changed from $M_1$ to $M_n$ by every depressing operation of the search key 20 and distances, required hours and running or walking speeds which are calculated on the basis of scale-reduction values, distance units and actually measured distances are displayed, respectively. When it is decided at step $ST_{12}$ that the value of P reaches to the sum of the last value $P_n$ of the display register and "1", the process goes to step $ST_{13}$, at which the total distance and the total hour are calculated. More specifically, in the example shown at A in FIG. 13, the total value 64.31 km, which is the sum of distance data stored in the registers $P_1$ through $P_n$ of RAM 3 and the total value 13 hours and 41 minutes, which is the sum of required hour data stored in the registers $P_1$ through $P_n$ are calculated. At step $ST_{14}$, division 61.31 km ÷ 13 hours 41 minutes is performed and the quotient, 4.7 km/H is displayed as a mean speed per hour on the display section 29.

In case that units of different unit systems such as "km" and "mile" are confusingly used and stored in respective registers, data having different units may be converted into data having the same unit to be added together and displayed or an error indication "E" may be displayed while data are not summed up.

The above described functions allow a map meter to be realized, in which distance data and speed data with respect to one trip or one tour can be divided into several groups for memorization and distance data and a mean speed per hour can be calculated and displayed.

What is claimed is:

1. A length measuring apparatus, comprising:
   data storing means having a number of data storage areas, such including a distance data storing area for storing distance data, a required-time data storing area for storing required-time data and a velocity data storing area for storing velocity data;
   scale-reduction data storing means for storing scale-reduction data;
   length measurement means for measuring length of a path connecting two points on a map;
   distance data operation means for operating on the length data measured by said length measurement means and the scale-reduction data stored in said scale-reduction data storing means to obtain distance data, and for storing the distance data thus obtained in a distance data storing area of said data storing means;
   data input means for inputting and storing velocity data or required-time data in a velocity data storing area or in a required-time data storing area corresponding to said distance data storing area;
   first operation means for calculating required-time data or velocity data on the basis of the velocity data stored by said data input means in said velocity data storing area or the required-time data stored by said data input means and the distance data stored in the pertinent distance data storing area, and for storing the required-time data or velocity data thus calculated in the pertinent required-time data storing area or velocity data storing area;
   first display means for displaying the distance data stored in the distance data storing area of said data storing areas, the required-time data stored in the required-time data storing area corresponding to said distance data storing area and the velocity data stored in the velocity data storing area corresponding to said distance data storing area;
   second operation means for calculating sum data of a number of distance data stored in said number of data storing areas, sum data of a number of required-time data stored in said number of data storing areas, and mean velocity data; and
   second display means for displaying the sum data of the distance data, the sum data of the required-time data and the mean velocity data, as calculated by said second operation means.

2. A length measuring apparatus according to claim 1, wherein said length measurement means comprises a rolling member which rolls along the path connecting said two points on the map and means for obtaining length data from a number of rotations of said rolling member.

3. A length measuring apparatus according to claim 1, wherein said length measurement means comprises a rolling member which rolls along the path connecting said two points on the map and detection means for detecting the number of rotation of said rolling member; and said detection means comprises light emission means;
light receiving means for receiving light emitted from said light emission means and for outputting a signal in response to light thus received; and
a rotating disc disposed between said light emission means and said light receiving means, and adapted to rotate in response to the rotation of said rolling member.

4. A length measuring apparatus according to claim 1, wherein said length measurement means is mounted on a wrist watch.

5. A length measuring apparatus according to claim 1, wherein said scale-reduction data storing means is provided with a number of scale-reduction data storing areas, which correspond to the data storing areas, respectively.

6. A length measuring apparatus according to claim 1, wherein said first display means includes means for displaying the distance data, the required-time data and the velocity data, simultaneously.

7. A length measuring apparatus according to claim 1, wherein said first display means includes means for selectively displaying the distance data, the required data and the velocity data stored in each of the data storing areas.

8. A length measuring apparatus according to claim 1, wherein said first display means is provided with a single operating switch arranged for displaying selectively and sequentially the distance data, the required-time data and the velocity data stored in each of the data storing areas, and said second display means includes means for displaying the sum data of the distance data, the sum data of the required-time data and the mean velocity data in accordance with operation of said operating switch, after all data stored in said data storing areas have been displayed by said first display means.

9. A length measuring apparatus according to claim 1, wherein said number of data storing areas are each provided with unit data storing means for storing length unit data for the distance data stored in the distance data storing area.

10. A length measuring apparatus according to claim 9, wherein said unit data storing means stores unit data which is selected from among a plurality of unit data.

11. A length measuring apparatus, comprising:
length memory means for storing first length data of a scale-reduction scale;
distance-index data input means for inputting distance-index data of the scale-reduction scale on a map;
scale-reduction data operation means for performing operations on the first length data stored in said length memory means and the distance-index data input by said distance-index data input means, to obtain scale-reduction data;
length measurement means for measuring length of a path connecting two points on the map to obtain second length data;
distance data operation means for performing operations on the second length data obtained by said length measurement means and the scale-reduction data obtained by said scale-reduction data operation means, to obtain distance data;
data memory means, having a number of distance data storing areas for storing distance data, a number of required-time data storing areas that are provided for the distance data storing areas, respectively, and a number of velocity data storing areas which are provided for the distance data storing areas respectively, and for storing distance data obtained by said distance data operation means in said number of distance data storing areas, respectively;
data input means for inputting and storing velocity data and required-time data in said plurality of velocity data storing areas and said plurality of required-time data storing areas, respectively;
first operation means for calculating required-time data or velocity data on the basis of the velocity data, or the required-time data, respectively, stored by said data input means and the distance data stored in the pertinent distance data storing area, and for storing the calculated required-time data, respectively, or velocity data in the pertinent required-time data storing area, respectively, or velocity data storing area, respectively;
first display means for displaying the distance data stored in said distance data storing area, the required-time data stored in the required-time data storing area provided for said distance data storing area, and the velocity data stored in the velocity data storing area provided for said distance data storing area;
second operation means for calculating sum data of a number of distance data stored in said distance data storing areas, sum data of a number of required-time data stored in said required-time data and the calculated mean velocity data.

12. A length measuring apparatus according to claim 11, wherein said length measurement means comprises a rolling member which rolls along the path connecting said two points on the map and means for obtaining length data from a number of rotations of said rolling member.

13. A length measuring apparatus according to claim 11, wherein said length measurement means comprises a rolling member which rolls along the path connecting said two points on the map; and detection means for detecting the number of rotations of said rolling member; and said detection means comprises light emission means; light receiving means for receiving light emitted from said light emission means and for outputting a signal in response to light thus received; and
a rotating disc disposed between said light emission means and said light receiving means, and adapted to rotate in response to the rotation of said rolling member.

14. A length measuring apparatus according to claim 11, wherein said length measurement means is mounted on a wristwatch.

15. A length measuring apparatus according to claim 11, wherein said data memory means is provided with a number of scale-reduction data storing areas, which correspond to the number of distance data storing areas, respectively.

16. A length measuring apparatus according to claim 11, wherein said first display means include means for displaying the distance data, the required-time data and the velocity data, simultaneously.

17. A length measuring apparatus according to claim 11, wherein said first display means includes means for selectively displaying the distance data, the required-time data and the velocity data stored in said data memory means.

18. A length measuring apparatus according to claim 11, wherein said first display means is provided with a single operating switch arranged for displaying selectively and sequentially the distance data, the required-time data and the velocity data stored in said data memory means, and said second display means includes means for displaying the sum data of the distance data, the sum data of the required-time data and the mean velocity data in accordance with operation of said operating switch, after all data stored in said data memory means have been displayed by said first display means.

19. A length measuring apparatus according to claim 11, wherein said data memory means is provided with unit data storing means for storing length unit data for the distance data stored in said distance data storing area.

20. A length measuring apparatus according to claim 19, wherein said unit data storing means stores unit data which is selected from among a plurality of unit data.

* * * * *

UNITED STATES PATENT AND TRADEMARK OFFICE
CERTIFICATE OF CORRECTION

PATENT NO. : 5,062,063

DATED : October 29, 1991

INVENTOR(S) : SHIMIZU, Atsuko

It is certified that error appears in the above-identified patent and that said Letters Patent is hereby corrected as shown below:

Column 10, line 59 (claim 3), change "rotation" to --rotations--.

Column 12, line 22 (claim 11), after "data",

Insert --storing areas and the mean velocity data; and second display means for displaying the calulated sum data of the distance data, the calculated sum data of the required-time data--.

Signed and Sealed this

Twelfth Day of July, 1994

Attest:

BRUCE LEHMAN

Attesting Officer     Commissioner of Patents and Trademarks